United States Patent
Brumley, II et al.

(10) Patent No.: US 9,438,341 B2
(45) Date of Patent: Sep. 6, 2016

(54) OPTICAL COMMUNICATION SYSTEM

(71) Applicant: LASER LIGHT COMMUNICATIONS LLC, Reston, VA (US)

(72) Inventors: Robert H. Brumley, II, Weems, VA (US); Robert H. Brumley, III, Richmond, VA (US); Richard Rosenthal, Leesburg, VA (US); Steven Birrell, Charles Town, WV (US); Michael J. Reedy, Kingsport, TN (US); Fletcher W. Brumley, Washington, DC (US)

(73) Assignee: LASER LIGHT COMMUNICATIONS LLC, Reston, VA (US)

( * ) Notice: Subject to any disclaimer, the term of this patent is extended or adjusted under 35 U.S.C. 154(b) by 47 days.

(21) Appl. No.: 14/601,199

(22) Filed: Jan. 20, 2015

(65) Prior Publication Data

US 2015/0207562 A1    Jul. 23, 2015

Related U.S. Application Data

(60) Provisional application No. 61/929,865, filed on Jan. 21, 2014.

(51) Int. Cl.
*H04B 10/00* (2013.01)
*H04B 10/118* (2013.01)
*G06N 99/00* (2010.01)

(52) U.S. Cl.
CPC ........... *H04B 10/118* (2013.01); *G06N 99/005* (2013.01)

(58) Field of Classification Search
CPC .................................................... H04B 10/118
See application file for complete search history.

(56) References Cited

U.S. PATENT DOCUMENTS

2010/0085916 A1* 4/2010 Yu ........................... H04L 45/00
                                                     370/328
2010/0085948 A1* 4/2010 Yu ........................... H04L 12/66
                                                     370/338

(Continued)

*Primary Examiner* — Danny Leung
(74) *Attorney, Agent, or Firm* — Pillsbury Winthrop Shaw Pittman LLP

(57) ABSTRACT

The present disclosure describes an automated, cognitive based computing system using artificial intelligence (AI) and machine learning algorithms to sense, predict, and infer network conditions, configured to dynamically manage transmission of information between communication nodes. The communication nodes comprise orbital nodes positioned in orbit above earth and terrestrial nodes coupled with earth interconnected via a hybrid mesh network topology. One or more automated, cognitive based physical computing processors, using artificial intelligence (AI) and machine learning algorithms to sense, predict, and infer network conditions, determine a target terrestrial node to receive information initially stored on a first orbital node; determine transmission conditions between the target terrestrial node and the first orbital node based on output signals from sensors; dynamically determine whether transmission conditions between the first orbital node and the target terrestrial node prevent optical transmission of the information directly from the first orbital node to the target terrestrial node; and, responsive to a determination that transmission conditions prevent optical transmission of the information to the target terrestrial node from the first orbital node, automatically transmit the information along an alternate route between the first orbital node and the target terrestrial node, wherein the alternate route includes transmission between some orbital node and an alternative target terrestrial node other than the target terrestrial node.

14 Claims, 4 Drawing Sheets

(56) References Cited

U.S. PATENT DOCUMENTS

2011/0286325 A1* 11/2011 Jalali ............ H04B 7/18506 370/221

2015/0207562 A1* 7/2015 Brumley, II ......... H04B 10/118 398/125

* cited by examiner

OPTICAL COMMUNICATION SYSTEM

FIELD

This disclosure relates to an automated, cognitive based computing system using artificial intelligence (AI) and machine learning algorithms to sense, predict, and infer network conditions, configured to dynamically manage transmission of information via optical communication signals between orbital and terrestrial communication nodes interconnected via a hybrid mesh network topology.

BACKGROUND

Typically, satellite to ground communication is accomplished with radio frequency (RF) signals. Optical communication signals are generally not used for satellite to ground communication because cloudy weather and/or other atmospheric conditions interrupt optical communication signals so that the transmitted information does not reach its intended target. The present disclosure overcomes limitations of prior art systems.

SUMMARY

One aspect of the present disclosure relates to an automated and cognitive based computing system using artificial intelligence (AI) and machine learning algorithms to sense, predict, and infer network conditions, configured to dynamically manage transmission of information between communications nodes interconnected via a hybrid mesh network topology. The communication orbital nodes positioned in orbit above Earth, terrestrial nodes coupled with Earth, and/or other nodes. The automated and cognitive based system comprises one or more sensors, one or more physical computer processors, and/or other components. The one or more sensors are configured to dynamically generate output signals conveying information related to transmission conditions between nodes. The one or more automated physical computer processors are configured, by computer readable instructions, to dynamically determine a target terrestrial node to receive information initially stored on a first orbital node; determine transmission conditions between the target terrestrial node and the first orbital node based on the output signals; determine whether transmission conditions between the first orbital node and the target terrestrial node prevent optical transmission of the information directly from the first orbital node to the target terrestrial node; and, responsive to a determination that transmission conditions prevent optical transmission of the information to the target terrestrial node from the first orbital node, transmit the information along an alternate route between the first orbital node and the target terrestrial node, wherein the alternate route includes transmission between some orbital node and an alternative target terrestrial node other than the target terrestrial node.

Another aspect of the present disclosure relates to an automated and cognitive based computing system using artificial intelligence (AI) and machine learning algorithms to sense, predict, and infer network conditions, configured to dynamically manage transmission of information between communications nodes interconnected via a hybrid mesh network topology. The system comprises orbital communication nodes, terrestrial communication nodes, one or more automated physical computer processors, and/or other components. The orbital communication nodes are positioned in orbit above Earth. The orbital nodes are configured to dynamically communicate with each other and the terrestrial nodes by transmitting and receiving optical communication signals. The terrestrial nodes are located at various locations on Earth. The terrestrial communication nodes are configured to dynamically communicate with each other and the orbital communication nodes by transmitting and receiving optical communication signals. The terrestrial communication nodes include a target terrestrial node and an alternative target terrestrial node. The one or more automated physical computer processors are configured, by computer readable instructions, to dynamically facilitate transmission and receipt of the optical communication signals by the orbital nodes and the terrestrial nodes such that, responsive to transmission conditions preventing optical communication signals from communicating information initially stored on a first orbital node to the target terrestrial node directly from the first orbital node, the one or more automated physical computer processors facilitate dynamic transmission of the information along an alternate route between the first orbital node and the target terrestrial node, wherein the alternate route includes transmission of optical signals between some orbital node and the alternative target terrestrial node.

Another aspect of the present disclosure is related to a method for managing transmission of information between communication nodes using an automated and cognitive based computing system using artificial intelligence (AI) and machine learning algorithms to sense, predict, and infer network conditions, configured to dynamically manage transmission of information between communications nodes interconnected via a hybrid mesh network topology. The communication nodes comprise orbital nodes positioned in orbit above Earth, terrestrial nodes at various locations on Earth, and/or other nodes. The method comprises dynamically generating output signals conveying information related to transmission conditions between nodes; determining a target terrestrial node to receive information initially stored on a first orbital node; determining transmission conditions between the target terrestrial node and the first orbital node based on the output signals; determining whether transmission conditions between the first orbital node and the target terrestrial node prevent optical transmission of the information directly from the first orbital node to the target terrestrial node; and responsive to a determination that transmission conditions prevent optical transmission of the information to the target terrestrial node from the first orbital node, transmitting the information via optical communication signals along an alternate route between the first orbital node and the target terrestrial node, wherein the alternate route includes transmission of optical communication signals between some orbital node and an alternative target terrestrial node other than the target terrestrial node.

These and other objects, features, and characteristics of the system or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

DETAILED DESCRIPTION

Figure 1A:
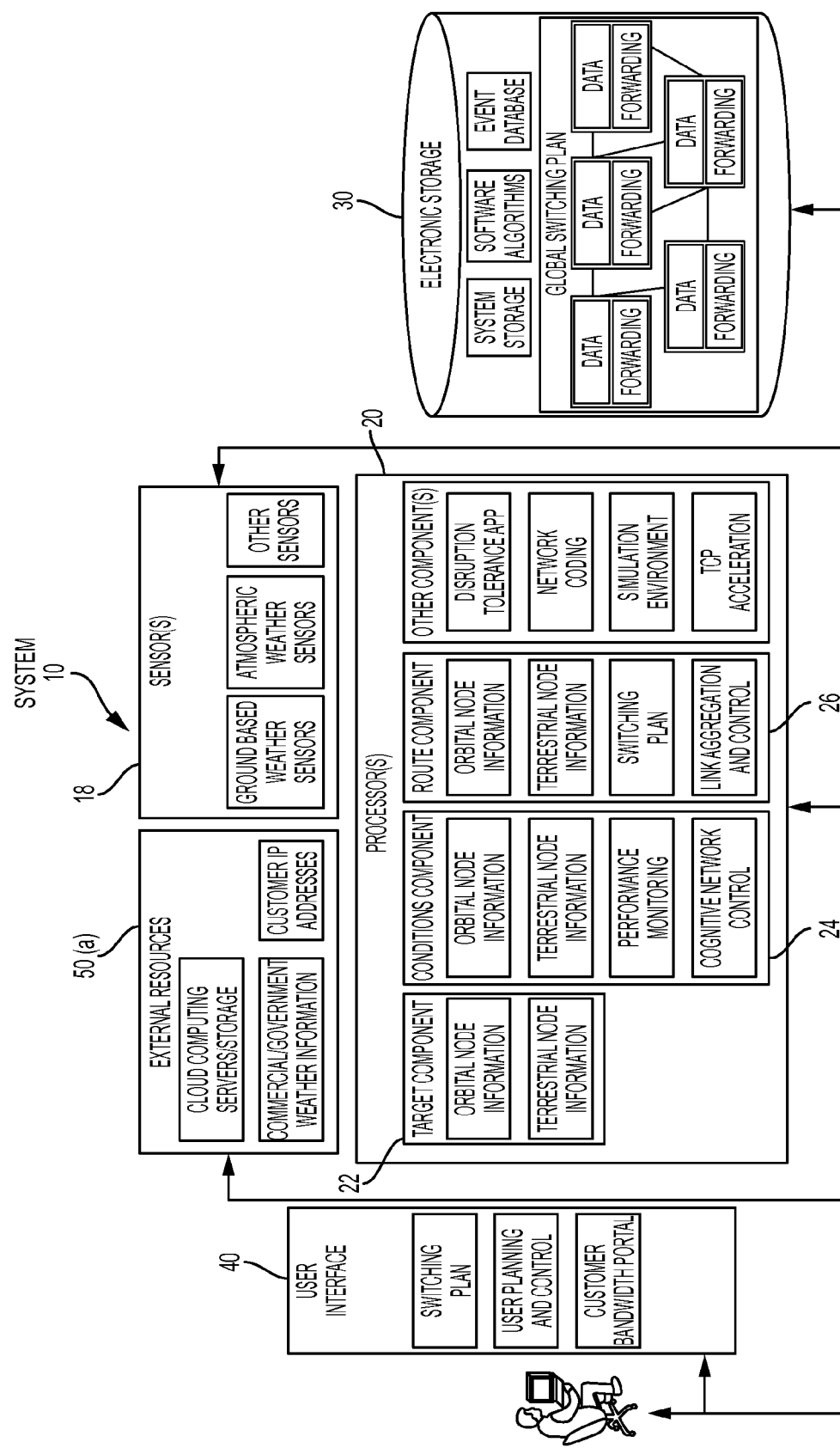
FIGS. 1A and 1B illustrates an automated and cognitive based computing system (System 10) using artificial intelligence (AI) and machine learning algorithms to sense, predict, and infer network conditions, configured to dynamically manage transmission of information via optical communication signals between orbital and/or terrestrial communications nodes interconnected via a hybrid mesh network topology.

FIG. 1 illustrates a system 10 configured to manage the transmission of information using an automated and cognitive based computing system using artificial intelligence (AI) and machine learning algorithms to sense, predict, and infer network conditions, configured to dynamically manage transmission of information using optical communication signals between orbital communication nodes 14 (e.g., satellites), between orbital communication nodes 14 and terrestrial communication nodes 16, and/or between terrestrial communication nodes 16 all interconnected via a hybrid mesh network topology. In some implementations, system 10 may be a hybrid satellite—terrestrial optical communication system. Optical communication signals may be advantageous at least because they facilitate transmission of larger amounts of information at higher transfer rates relative to radio frequency and/or other signals. However, optical communication signals transmitted between orbital communication nodes 14 and terrestrial communication nodes 16, for example, may be interrupted by clouds and/or other optical turbulence between nodes 14,16.

System 10 may be configured to dynamically detect weather and/or other transmission conditions between nodes that normally interrupt optical communication signals transmitted between satellites and ground based communication components using an automated and cognitive based computing system using artificial intelligence (AI) and machine learning algorithms to sense, predict, and infer network conditions. System 10 may be configured to automate the management of orbital communication nodes 14 and terrestrial communication nodes 16 in concert with each other to dynamically re-route optical communication signals around disruptive weather and/or other disruptive transmission conditions. When a target terrestrial communication node and/or a source terrestrial communication node is blocked by weather and/or other disruptive transmission conditions from sending and/or receiving optical communication signals to and/or from a given orbital communication node, system 10 may dynamically re-route transmission of the optical communication signal. System 10 may dynamically re-route transmission to a target terrestrial node and/or from a source terrestrial node through one or more other orbital communication nodes 14 and/or one or more alternative terrestrial communication nodes 16. The one or more alternative terrestrial communication nodes may be located geographically near the target/source terrestrial communication node but may not be blocked by weather and/or other disruptive transmission conditions from communicating with orbital communication nodes 14. The alternative terrestrial communication node may transmit and/or receive the optical communication signals to and/or from the target terrestrial node before and/or after communicating with an orbital communication node 14. In some implementations, system 10 may include one or more of an orbital communication node 14, a terrestrial communication node 16, a sensor 18, a processor 20, electronic storage 30, a user interface 40, external resources 50, and/or other components.

Figure 1B:
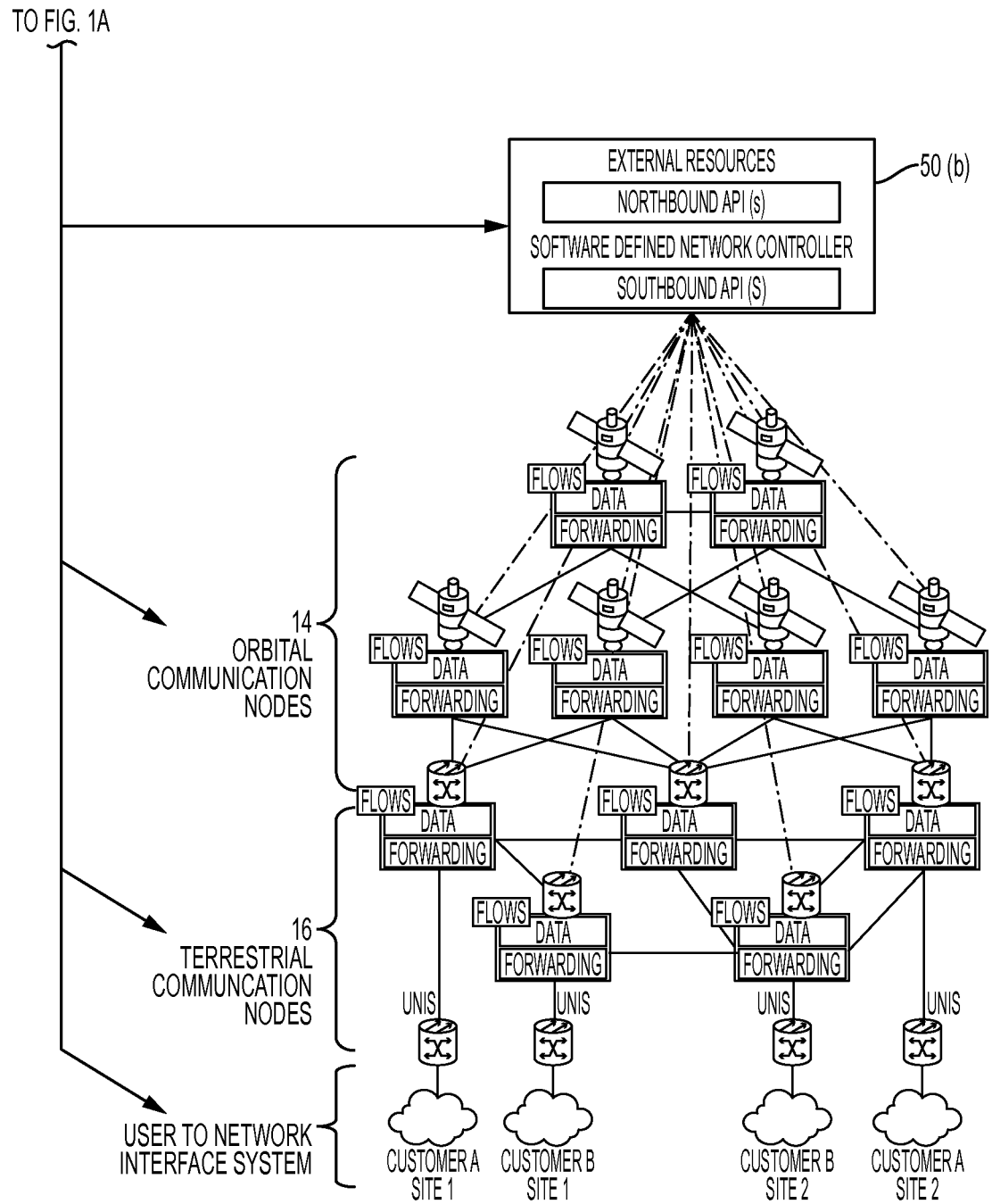
Figure 2:
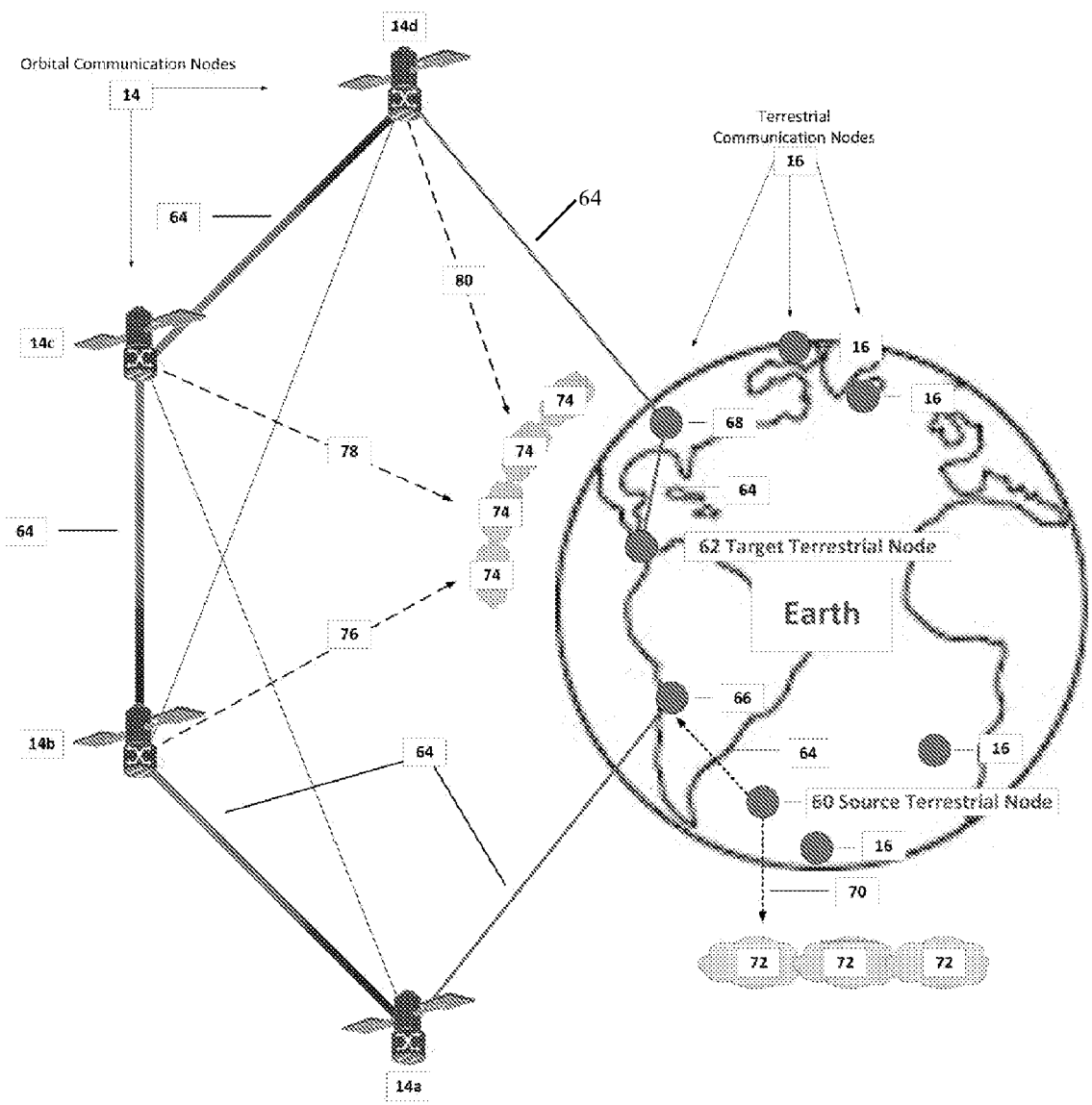
FIG. 2 illustrates optical communication signals dynamically transmitted between terrestrial communication nodes and/or orbital communication nodes using an automated and cognitive based computing system using artificial intelligence (AI) and machine learning algorithms to sense, predict, and infer network conditions, configured to dynamically manage transmission of information between communications nodes interconnected via a hybrid mesh network topology.

By way of a non-limiting example, FIG. 2 illustrates optical communication signals transmitted between terrestrial communication nodes 16 and orbital communication nodes 14a-14d. In FIG. 2, information from a source terrestrial communication node 60 may be transmitted to a target terrestrial communication node 62 using optical communication signals 64. The optical communication signals may be dynamically transmitted through alternative terrestrial communication nodes 66 and 68, and orbital communication nodes 14a-14d. Information initially stored by source terrestrial communication node 60 may be blocked from being directly transmitted to orbital communication node 14a using an optical communication signal 70 by clouds 72. In response, system 10 (FIGS. 1A and 1B) is configured to automatically facilitate transmission of the information to orbital communication node 14a dynamically via alternative terrestrial communication node 66 whose path to orbital communication node 14a is not blocked by clouds 72.

In the example shown in FIG. 2, orbital communication nodes 14a-14d are blocked from transmitting optical communication signals 76, 78, and 80 to target terrestrial communication node 62 by clouds 74 so optical communication signals 64 conveying the information originally stored on source node 60 are dynamically transmitted between orbital communication nodes 14a-14d to alternative terrestrial communication node 68. Orbital communication node 14d has a clear path to transmit optical communication signals conveying the information to alternative terrestrial communication node 68, which then transmits the information to target terrestrial node 62. It should be noted that system 10 (FIGS. 1A and 1B) is configured to automatically facilitate transmission of the information originally stored on source terrestrial node 60 to target terrestrial node 62 using the quickest and/or most efficient pathway available using an automated and cognitive based computing system using artificial intelligence (AI) and machine learning algorithms to sense, predict, and infer network conditions. FIG. 2 is only an example. A multitude of different pathways may exist between the various terrestrial communication nodes 16 and the orbital communication nodes 14a-14d. In this example, system 10 may be configured such that orbital communication node 14a may dynamically transmit optical communication signals directly to orbital communication node 14*d* instead of through nodes 14*b* and 14*c*, for example.

Returning to FIGS. 1A and 1B, orbital communication nodes 14 may be configured to communicate with each other and/or terrestrial nodes by transmitting and receiving optical communication signals. Orbital communication nodes 14 may be positioned in orbit above earth (FIG. 2). Orbital nodes 14 may be satellites, for example. In some implementations, information stored on a first orbital node is communicated to other orbital nodes and/or terrestrial nodes via the optical communication signals. The information stored on the first orbital node may be received from other orbital nodes and/or terrestrial nodes.

In some implementations, the optical communication signals may be laser light beams. In some implementations, the optical communication signals may have a frequency between about 186 THz and about 197 THz, for example. In some implementations, the optical communication signals may have a wavelength of between about 1500 nm and about 1650 nm, for example.

In some implementations, system 10 may be configured such that orbital communication nodes 14 form an automated, dynamically self-healing satellite constellation interconnected via a hybrid mesh network topology. A self-healing satellite constellation may be configured to automatically divert optical communication signals around non-functioning orbital communication nodes 14 using an automated and cognitive based computing system using artificial intelligence (AI) and machine learning algorithms to sense, predict, and infer network conditions. In some implementations, system 10 may comprise up to about 25 orbital communication nodes 14. In some implementations, system 10 may comprise about 8 to about 12 orbital communication nodes 14. In some implementations, system 10 may comprise more than about 3 orbital communication nodes 14. In some implementations, communication nodes 14 may have more than about a 3 Terabit bi-directional in-orbit capacity. In some implementations, communication nodes 14 may have more than about a 6 Terabit bi-directional in-orbit capacity. In some implementations, communication nodes 14 may have more than about a 12 Terabit bi-directional in-orbit capacity.

In some implementations, orbital communication nodes 14 may include laser terminals, optical routing and switching components, uplink (signal receiving) components, downlink (signal transmitting components), crosslink (transmit/receive) components, and/or other components. In some implementations, a given orbital communication node 14 may be configured to crosslink with two nearest neighbors on each side and simultaneously up/downlink via four up/downlink paths substantially simultaneously.

Terrestrial communication nodes 16 may be configured to communicate with each other and/or the orbital nodes by transmitting and receiving optical communication signals. Terrestrial communication nodes 16 may be coupled with and/or located at various locations on Earth (FIG. 2). Terrestrial communication nodes 16 may be physically constructed on and/or near the surface of the earth, may be connected to and/or otherwise coupled with terrestrial optical communication networks (e.g., terrestrial fiber networks deployed globally in a hybrid mesh network topology), and/or other coupling with Earth and/or Earth based systems. Terrestrial communication nodes 16 may include physical buildings, computing devices, antennas, towers, signal receiving equipment, signal transmission equipment, and/or other components. In some implementations, system 10 comprises up to about 150 terrestrial communication nodes 16. In some implementations, system 10 comprises about 48 to about 96 terrestrial communication nodes 16. In some implementations, system 10 comprises more than about 25 terrestrial communication nodes 16.

In some implementations, terrestrial communication nodes 16 may be geographically distributed in various physical locations around the earth interconnected via a hybrid mesh network topology. In some implementations, geographic locations of terrestrial communication nodes 16 may be determined based on atmospheric modeling and/or simulation. In some implementations, the locations of terrestrial communication nodes 16 may mitigate the impact of atmospheric conditions on disruption of optical communication signals. In some implementations, terrestrial communication nodes 16 may include bi-directional (up/downlink) linking components, optical routing and/or switching components, and/or other components.

As part of an automated, cognitive based computing system using artificial intelligence (AI) and machine learning algorithms to sense, predict, and infer network conditions, sensors 18 may be configured to dynamically generate output signals conveying information related to transmission conditions between communication nodes. The communication nodes may include orbital nodes 14, terrestrial nodes 16, and/or other nodes. Sensors 18 may be configured to generate output signals conveying information related to transmission conditions between two or more orbital nodes 14, between two or more terrestrial nodes 16, between at least one orbital node 14 and at least one terrestrial node 16, and/or between other nodes. The transmission conditions may include ambient weather conditions, operational conditions of individual nodes, congestion in the system, and/or other transmission conditions. Sensors 18 may include ground based weather sensors, atmospheric weather sensors, space based (e.g., satellite) weather sensors, and/or other sensors that generate output signals that convey information related to the ambient weather conditions between communication nodes. Sensors 18 may be and/or include sensors that are part of a commercial and/or governmental weather information service such as the National Weather Service (e.g., external resources 50). For example, as part of an automated, cognitive based computing system using artificial intelligence (AI) and machine learning algorithms to sense, predict, and infer network conditions, sensors 18 may generate output signals that convey information that indicates that there are clouds between a first orbital communication node and a target terrestrial node.

As part of an automated, cognitive based computing system using artificial intelligence (AI) and machine learning algorithms to sense, predict, and infer network conditions, sensors 18 may be configured to automatically and dynamically generate output signals that convey information related to operational conditions of individual nodes. Information related to operational conditions of individual nodes may be and/or be related to an individual node's readiness to send and/or receive optical communication signals, congestion in the system, and/or other information. This may include, for example, mechanical information related to physical components of the communication nodes, information related to software, processors, and/or computing systems that are part of the communication nodes, and/or other information. Sensors 18 may include mechanical sensors (e.g., transducers), chemical sensors (e.g., oxygen sensors), optical sensors, motion sensors, location (e.g., GPS) sensors, electrical field sensors, magnetic field sensors, orientation sensors, acoustic sensors, pressure and/or force sensors, thermal sensors, proximity sensors, radiation sensors, flow sensors, and/or other sensors that convey information about the operational conditions of individual nodes. For example, sensors 18 may generate output signals that convey information that indicates that the physical components of the first orbital communication node and the target terrestrial node are operational and ready to transmit and/or receive information using optical communication signals.

As part of an automated, cognitive based computing system using artificial intelligence (AI) and machine learning algorithms to sense, predict, and infer network conditions, processor 20 (one or more processors 20) may be configured to execute computer program components. The computer program components may be configured to facilitate dynamic communication between the communication nodes (e.g., among orbital nodes, between orbital nodes and terrestrial nodes, among terrestrial nodes) via optical communication signals, enable a user to interface with system 10, and/or provide other functionality attributed herein to system 10. The computer program components may include a target component 22, a conditions component 24, a route component 26, and/or other components.

As part of an automated, cognitive based computing system using artificial intelligence (AI) and machine learning algorithms to sense, predict, and infer network conditions, target component 22 may be configured to determine target terrestrial nodes to receive information initially stored on and/or transmitted by orbital nodes. This may include, as described above for example, determining an individual target terrestrial node to receive information initially stored on a first orbital node. Target component 22 may be configured to dynamically determine orbital communication nodes to receive information initially stored on terrestrial communication nodes. This may include, for example, determining an individual target orbital node to receive information initially stored on a source terrestrial communication node (see FIG. 2 for example). Target component 22 may dynamically determine target communication nodes based on information entered and/or selected by a user via user interface 40 (e.g., a switching plan), information provided by external resources 50 (e.g., an IP address), information conveyed by optical communication signals, and/or other information.

As part of an automated, cognitive based computing system using artificial intelligence (AI) and machine learning algorithms to sense, predict, and infer network conditions, conditions component 24 may be configured to dynamically determine transmission conditions between the target terrestrial node and the first orbital node. In some implementations, transmission conditions between any other individual orbital node and any other individual terrestrial node may be determined. For example, conditions component 24 may be configured to determine transmission conditions between a source terrestrial communication node and a given orbital communication node 14. The transmission conditions may be determined based on the dynamic output signals from sensors 18, information from external resources 50, and/or other information. Conditions component 24 may be configured to determine whether transmission conditions between the first orbital node and the target terrestrial node prevent optical transmission of the information directly from the first orbital node to the target terrestrial node.

As part of an automated, cognitive based computing system using artificial intelligence (AI) and machine learning algorithms to sense, predict, and infer network conditions, route component 26 may be configured to, if necessary, dynamically determine an alternate route between the first orbital node and the target terrestrial node. Responsive to a determination by conditions component 24 that transmission conditions prevent optical transmission of the information to the target terrestrial node from the first orbital node, for example, the information stored by the first orbital node may be dynamically transmitted via optical communication signals along an alternate route between the first orbital node and the target terrestrial node. The alternate route may include transmission of optical communication signals between some orbital node and an alternative target terrestrial node other than the target terrestrial node. Transmission between some orbital node and the alternative target terrestrial node may include transmission from the first orbital node to the alternative terrestrial node. Transmission between some orbital node and the alternative target terrestrial node may include transmission from a second orbital node to the alternative terrestrial node. Route component 26 may similarly determine a route between a source terrestrial communication node and a given orbital communication node.

In some implementations, as part of an automated, cognitive based computing system using artificial intelligence (AI) and machine learning algorithms to sense, predict, and infer network conditions, route component 26 may dynamically determine routes between communication nodes based on a switching plan and/or other information communicated to system 10 via user interface 40, from external resources 50, and/or from other sources. In some implementations, route component 26 may dynamically determine routes between communication nodes based on the output signals from sensors 18, operational information from and/or about individual communication nodes 16 and/or 18, and/or other information.

As part of an automated, cognitive based computing system using artificial intelligence (AI) and machine learning algorithms to sense, predict, and infer network conditions, electronic storage 30 may comprise electronic storage media that electronically stores information. The electronic storage media of electronic storage 30 may comprise one or both of system storage that is provided integrally (i.e., substantially non-removable) with system 10 and/or removable storage that is removable and connectable to system 10 via, for example, a port (e.g., a USB port, a firewire port, etc.) or a drive (e.g., a disk drive, etc.). Electronic storage 30 may comprise one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. Electronic storage 30 may store software algorithms, information (e.g., that was previously optically communicated and/or for subsequent optical communication) determined by processor 18, and/or other information that enables system 10 to function properly. Electronic storage 30 may be (in whole or in part) a separate component within system 10, or electronic storage 30 may be provided (in whole or in part) integrally with one or more other components of system 10 (e.g., orbital communication nodes 14, terrestrial communication nodes 16, one or more processors 20).

As part of an automated, cognitive based computing system using artificial intelligence (AI) and machine learning algorithms to sense, predict, and infer network conditions, user interface 40 may be configured to provide an interface between system 10 and one or more users through which the users may dynamically provide information to and receive information from system 10. This enables data, cues, results, and/or instructions and any other communicable items, collectively referred to as "information," to be communicated between the users and system 10. Examples of interface devices suitable for inclusion in user interface 40 include one or more of a touch screen, a keypad, touch sensitive and/or physical buttons, switches, a keyboard, knobs, levers, a display, speakers, a microphone, an indicator light, an audible alarm, a printer, and/or other interface devices. In some implementations, user interface 40 includes a plurality of separate interfaces. In some implementations, the plurality of separate interfaces may be located in a plurality of separate geographical locations around the world. In some implementations, the plurality of separate geographic locations may correspond to the geographic locations of the terrestrial nodes. In some implementations, user interface 40 includes at least one interface that is provided integrally with one or more processors 20.

In some implementations, user interface 40 may be and/or include a graphical user interface displayed to users via a portable and/or other computing devices associated with a given user. The graphical user interface may be configured to present one or more views to users that facilitate providing information to and/or receiving information from the user such that the user need not be physically present at or near a terrestrial communication node to interact with system 10.

It is to be understood that other communication techniques, either hard-wired or wireless, are also contemplated by the present disclosure as user interface 40. For example, the present disclosure contemplates that user interface 40 may be integrated with a removable storage interface. In this example, information may be loaded into system 10 from removable storage (e.g., a smart card, a flash drive, a removable disk) that enables the user to customize the implementation of system 10. Other exemplary input devices and techniques adapted for use with system 10 as user interface 40 include, but are not limited to, an RS-232 port, RF link, an IR link, modem (telephone, cable or other). In short, any technique for communicating information with system 10 is contemplated by the present disclosure as user interface 40.

As part of an automated, cognitive based computing system using artificial intelligence (AI) and machine learning algorithms to sense, predict, and infer network conditions, External resources 50 may include sources of information (e.g., a weather information database), one or more servers outside of system 10, a network (e.g., the internet), electronic storage, equipment related to Wi-Fi technology, equipment related to Bluetooth® technology, data entry devices, scanning equipment, sensors, laptop computers, desktop computers, smartphones, and/or other resources. In some implementations, some or all of the functionality attributed herein to external resources 50 may be provided by resources included in system 10. External resources 50 may be configured to dynamically communicate with processor 20, orbital communication nodes 14, terrestrial communication nodes 16, sensors 18, user interface 40, and/or other components of system 10 via wired and/or wireless connections, via a network (e.g., a local area network and/or the internet), via cellular technology, via Wi-Fi technology, and/or via other resources. For example, conditions component 24 may access a weather information service server to dynamically augment and/or replace information determined from the output signals of sensors 18.

As part of an automated, cognitive based computing system using artificial intelligence (AI) and machine learning algorithms to sense, predict, and infer network conditions, processor 20 may be configured to dynamically provide information processing capabilities in system 10. As such, processor 20 may comprise one or more of a digital processor, an analog processor, a digital circuit designed to process information, an analog circuit designed to process information, a state machine, and/or other mechanisms for electronically processing information. Although processor 20 is shown in FIGS. 1A and 1B as a single entity, this is for illustrative purposes only. In some implementations, processor 20 may comprise a plurality of processing units. These processing units may be physically located within a singular device (e.g., a terrestrial communication node 16), or processor 20 may represent processing functionality of a plurality of devices operating in coordination (e.g., in terrestrial communication nodes 16 and/or orbital communication nodes 14). Processor 20 may be configured to automatically execute components 22, 24, and/or 26 by software; hardware; firmware; some combination of software, hardware, and/or firmware; and/or other mechanisms for configuring processing capabilities on processor 20.

As part of an automated, cognitive based computing system using artificial intelligence (AI) and machine learning algorithms to sense, predict, and infer network conditions, it should be appreciated that although components 22, 24, and 26 are illustrated in FIGS. 1A and 1B as being co-located within a single processing unit, in implementations in which processor 20 comprises multiple processing units, one or more of components 22, 24, and/or 26 may be located remotely from the other components (e.g., such as within one or more terrestrial nodes 16, one or more orbital communication nodes 14, one or more external resources 50 server computers, and/or in other locations). The description of the functionality provided by the different components 22, 24, and/or 26 described herein is for illustrative purposes, and is not intended to be limiting, as any of components 22, 24, and/or 26 may provide more or less functionality than is described. For example, one or more of components 22, 24, and/or 26 may be eliminated, and some or all of its functionality may be provided by other components 22, 24, and/or 26.

As another example, processor 20 may be configured to execute one or more additional components that may perform some or all of the functionality attributed below to one of components 22, 24, and/or 26. In some implementations, one or more of components 22, 24, and/or 26 may be executed by processors incorporated in terrestrial nodes 16, orbital communication nodes 14, one or more external resources 50 server computers, and/or other components of system 10.

Figure 3:
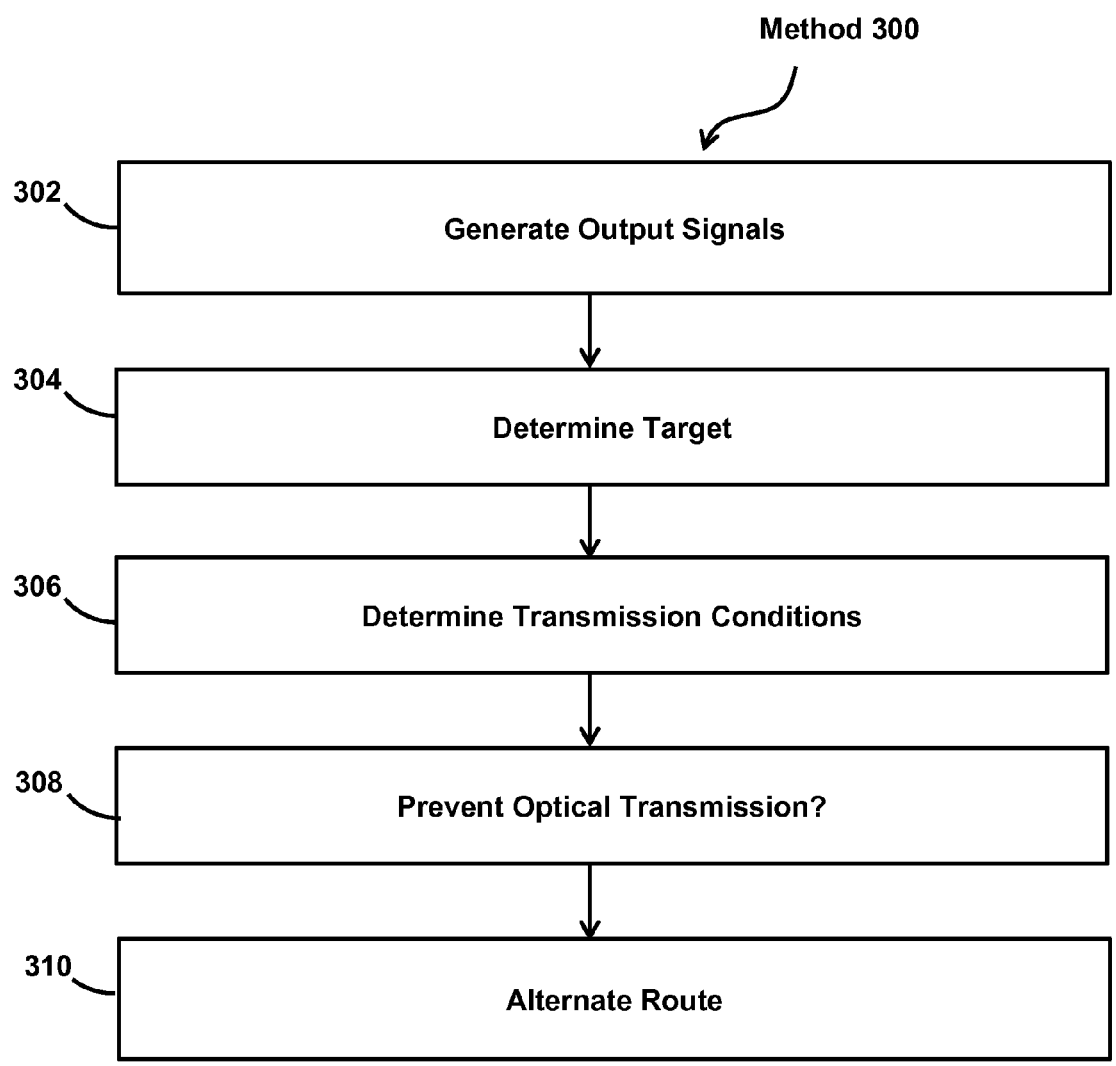
FIG. 3 illustrates a method (Method 300) for the management of the transmission of information via optical communication signals between orbital and/or terrestrial communication nodes using to automated and cognitive based computing system using artificial intelligence (AI) and machine learning algorithms to sense, predict, and infer network conditions, configured to dynamically manage transmission of information between communications nodes interconnected via a hybrid mesh network topology.

FIG. 3 illustrates a method 300 for dynamically managing transmission of information via optical communication signals between orbital and terrestrial communication nodes using an automated, cognitive based computing system. System 300 uses artificial intelligence (AI) and machine learning algorithms to sense, predict, and infer network conditions, configured to dynamically manage transmission of information via optical communication signals between orbital and terrestrial communication nodes interconnected via a hybrid mesh network topology. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices using artificial intelligence (AI) and machine learning algorithms to sense, predict, and infer network conditions, to dynamically execute some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, output signals conveying information related to transmission conditions between communication nodes interconnected via a hybrid mesh network topology may be dynamically generated. The communication nodes may include orbital nodes positioned in orbit above earth, terrestrial nodes coupled with earth, and/or other nodes. The orbital nodes may be satellites, for example. The transmission conditions may include ambient weather conditions, operational conditions of individual nodes, and/or other transmission conditions. In some implementations, operation 302 is performed by one or more sensors similar to and/or the same as sensor 18 (shown in FIGS. 1A AND 1B and described herein).

At an operation 304, a target terrestrial node to receive information initially stored on a first orbital node is determined. In some implementations, the information initially stored on the first orbital node is dynamically communicated to other orbital nodes and/or terrestrial nodes interconnected via a hybrid mesh network topology (e.g., including the target terrestrial node) via optical communication signals. The optical communication signals may be laser light beams. In some implementations, the optical communication signals may have a frequency between about 186 THz and about 197 THz, for example. In some implementations, the optical communication signals may have a wavelength of between about 1500 nm and about 1650 nm. The information initially stored on the first orbital node is not communicated to other orbital nodes and/or terrestrial nodes via radio frequency (RF) signals. In some implementations, operation 304 is performed by a processor component similar to and/or the same as target component 22 (shown in FIGS. 1A AND 1B and described herein).

At an operation 306, transmission conditions between the target terrestrial node and the first orbital node may be determined using artificial intelligence (AI) and machine learning algorithms to sense, predict, and infer network conditions. In some implementations, transmission conditions between any other individual orbital node and any other individual terrestrial node may be determined. The transmission conditions may be dynamically determined based on the output signals and/or other information. In some implementations, operation 306 is performed by a processor component similar to and/or the same as conditions component 24 (shown in FIGS. 1A and 1B and described herein).

At an operation 308, whether transmission conditions between the first orbital node and the target terrestrial node that prevent optical transmission of the information directly from the first orbital node to the target terrestrial node may be determined. In some implementations, operation 308 is performed by a processor component similar to and/or the same as conditions component 24 (shown in FIGS. 1A and 1B and described herein).

At an operation 310, if necessary, an alternate route between the first orbital node and the target terrestrial node may be dynamically determined. Responsive to a determination that transmission conditions prevent optical transmission of the information to the target terrestrial node from the first orbital node (operation 308), the information stored by the first orbital node may be dynamically transmitted via optical communication signals along an alternate route between the first orbital node and the target terrestrial node. The alternate route may include automated transmission of optical communication signals between some orbital node and an alternative target terrestrial node other than the target terrestrial node interconnected via a hybrid mesh network topology. Transmission between some orbital node and the alternative target terrestrial node may include transmission from the first orbital node to the alternative terrestrial node. Transmission between some orbital node and the alternative target terrestrial node may include transmission from a second orbital node to the alternative terrestrial node. In some implementations, operation 310 is performed by a processor component similar to and/or the same as route component 26 (shown in FIGS. 1A and 1B and described herein).

Although the system(s) or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An automated, cognitive based computing system using artificial intelligence (AI) and machine learning algorithms to sense, predict, and infer network conditions, configured to dynamically manage transmission of information via optical communication signals between orbital and terrestrial communication nodes interconnected via a hybrid mesh network topology, the communication nodes comprising orbital nodes positioned in orbit above earth and terrestrial nodes coupled with earth, the system comprising:
one or more sensors configured to dynamically generate output signals conveying information related to transmission conditions between nodes; and
one or more physical computer processors configured by computer readable instructions to:
automatically determine a target terrestrial node to receive information initially stored on a first orbital node;
dynamically determine transmission conditions between the target terrestrial node and the first orbital node based on the output signals;
determine whether transmission conditions between the first orbital node and the target terrestrial node prevent optical transmission of the information directly from the first orbital node to the target terrestrial node; and responsive to a determination that transmission conditions prevent optical transmission of the information to the target terrestrial node from the first orbital node, automatically transmit the information along an alternate route between the first orbital node and the target terrestrial node, wherein the alternate route includes transmission between some orbital node and an alternative target terrestrial node other than the target terrestrial node interconnected via a hybrid mesh network topology.

2. The system of claim 1, wherein the one or more automated, cognitive based physical computing processors, using artificial intelligence (AI) and machine learning algorithms to sense, predict, and infer network conditions are configured such that transmission between some orbital node and the alternative target terrestrial node includes transmission from the first orbital node to the alternative terrestrial node interconnected via a hybrid mesh network topology.

3. The system of claim 1, wherein the one or more automated, cognitive based physical computing processors, using artificial intelligence (AI) and machine learning algorithms to sense, predict, and infer network conditions, are configured such that transmission between some orbital node and the alternative target terrestrial node includes transmission from a second orbital node to the alternative terrestrial node interconnected via a hybrid mesh network topology.

4. The system of claim 1, wherein the one or more automated, cognitive based physical computing processors, using artificial intelligence (AI) and machine learning algorithms to sense, predict, and infer network conditions, dynamically determine transmission conditions between the transmitting orbital node and the alternative terrestrial node interconnected via a hybrid mesh network topology.

5. The system of claim 1, wherein the one or more automated, cognitive based physical computing processors, using artificial intelligence (AI) and machine learning algorithms to sense, predict, and infer network conditions, are configured such that the information initially stored on the first orbital node is dynamically communicated to other orbital nodes and/or terrestrial nodes via optical communication signals interconnected via a hybrid mesh network topology.

6. The system of claim 1, wherein the one or more automated, cognitive based physical computing processors, using artificial intelligence (AI) and machine learning algorithms to sense, predict, and infer network conditions, are configured such that the information initially stored on the first orbital node is not communicated to other orbital nodes and/or terrestrial nodes via radio frequency (RF) signals.

7. The system of claim 1, wherein the one or more automated, cognitive based physical computing processors, using artificial intelligence (AI) and machine learning algorithms to sense, predict, and infer network conditions, are configured such that the transmission conditions include one or more of ambient weather conditions or operational conditions of individual nodes interconnected via a hybrid mesh network topology.

8. An optical communication system composed of automated, cognitive based physical computing processors, using artificial intelligence (AI) and machine learning algorithms to sense, predict, and infer network conditions, configured to automatically manage transmission of information between communication nodes interconnected via a hybrid mesh network topology, the system comprising:

orbital nodes positioned in orbit above earth configured to communicate with each other and terrestrial nodes by transmitting and receiving optical communication signals;

terrestrial nodes coupled with earth configured to dynamically communicate with each other and the orbital nodes by transmitting and receiving optical communication signals, the terrestrial nodes including a target terrestrial node and an alternative target terrestrial node; and one or more automated, cognitive based physical computing processors, using artificial intelligence (AI) and machine learning algorithms to sense, predict, and infer network conditions configured by computer readable instructions to facilitate transmission and receipt of the optical communication signals by the orbital nodes and the terrestrial nodes such that, responsive to transmission conditions preventing optical communication signals from communicating information initially stored on a first orbital node to the target terrestrial node directly from the first orbital node, the one or more physical computer processors dynamically facilitate transmission of the information along an alternate route between the first orbital node and the target terrestrial node, wherein the alternate route includes transmission of optical signals between some orbital node and the alternative target terrestrial node interconnected via a hybrid mesh network topology.

9. The system of claim 8, wherein the orbital nodes and the terrestrial nodes are configured such that the optical communication signals are laser light beams.

10. The system of claim 8, wherein the orbital nodes and the terrestrial nodes are configured such that the optical communication signals have a frequency between about 186 THz and about 197 THz.

11. The system of claim 8, wherein the orbital nodes and the terrestrial nodes are configured such that the optical communication signals have a wavelength of between about 1500 nm and about 1650 nm.

12. The system of claim 8, wherein the orbital nodes are satellites.

13. The system of claim 8, wherein the one or more automated, cognitive based physical computing processors, using artificial intelligence (AI) and machine learning algorithms to sense, predict, and infer network conditions are configured such that the transmission conditions include ambient weather conditions.

14. A method for dynamically managing transmission of information between communication nodes based on automated, cognitive based physical computing processors, using artificial intelligence (AI) and machine learning algorithms to sense, predict, and infer network conditions, the communication nodes comprising orbital nodes positioned in orbit above earth and terrestrial nodes coupled with earth interconnected via a hybrid mesh network topology, the method comprising:

dynamically generating output signals conveying information related to transmission conditions between nodes;

determining a target terrestrial node to receive information initially stored on a first orbital node;

determining transmission conditions between the target terrestrial node and the first orbital node based on the output signals;

determining whether transmission conditions between the first orbital node and the target terrestrial node prevent optical transmission of the information directly from the first orbital node to the target terrestrial node; and responsive to a determination that transmission conditions prevent optical transmission of the information to the target terrestrial node from the first orbital node, transmitting the information via optical communication signals dynamically along an alternate route between the first orbital node and the target terrestrial node, wherein the alternate route includes transmission of optical communication signals between some orbital node and an alternative target terrestrial node other than the target terrestrial node.

* * * * *